United States Patent [19]

Shimakura et al.

[11] Patent Number: 5,731,372
[45] Date of Patent: Mar. 24, 1998

[54] RUST INHIBITING COATING COMPOSITION FOR ZINC, ZINC ALLOY PLATED OR UNPLATED STEEL

[75] Inventors: Toshiaki Shimakura, Ichikawa; Mika Teraoka, Suita; Tetsuro Kishimoto, Izumiotsu; Yuichi Yoshida, Neyagawa; Kazuhiko Usuki, Osaka, all of Japan

[73] Assignee: Nippon Paint Co., Ltd., Osaka, Japan

[21] Appl. No.: 626,930

[22] Filed: Apr. 3, 1996

[30] Foreign Application Priority Data

Apr. 3, 1995 [JP] Japan ................................. 7-102939

[51] Int. Cl.$^6$ ............................ C08K 3/36; C08K 3/32
[52] U.S. Cl. ...................... 524/417; 427/318; 524/493
[58] Field of Search ............................ 524/415, 416, 524/417, 414, 832, 706, 789, 493, 819, 823; 427/318; 525/255, 301; 523/451

[56] References Cited

U.S. PATENT DOCUMENTS

| | | | |
|---|---|---|---|
| 3,671,295 | 6/1972 | Ravve et al. | 524/417 |
| 4,428,774 | 1/1984 | Drake et al. | 524/414 |
| 4,812,327 | 3/1989 | Hanazawa et al. | 427/388.4 |
| 5,064,468 | 11/1991 | Okai et al. | 106/14.12 |

FOREIGN PATENT DOCUMENTS

| | | | |
|---|---|---|---|
| 703082 | 2/1965 | Canada | 524/417 |
| 214 616 | 10/1984 | Germany . | |
| 53-80430 | 7/1978 | Japan | 524/417 |
| 55-11038 | 1/1980 | Japan . | |
| 56-104976 | 8/1981 | Japan | 524/415 |
| 57-75823 | 5/1982 | Japan . | |
| 60-240774 | 11/1985 | Japan | 524/417 |
| 2129812 | 5/1984 | United Kingdom | 524/417 |

OTHER PUBLICATIONS

Harold P. Preussi: *Paint Additives*, 145–149, 161–165, Noyes Data Corp., Park Ridge, N.J., 1970.

*Primary Examiner*—Veronica P. Hoke
*Attorney, Agent, or Firm*—Pollock, Vande Sande & Priddy

[57] ABSTRACT

The invention provides a rust inhibiting technology for zinc-coated and uncoated steel which insures at least the equivalent of results obtainable by the technology using a Cr-containing coating composition.

This method comprises coating a zinc-coated or uncoated steel substrate with a water-based resin composition comprising a carboxylated polyolefin resin and 70-0 part by weight of solid matter of at least one member selected from the group consisting of polyurethane resin, polyester resin, acrylic resin, epoxy resin, and alkyd resin as supplemented with 0.01–0.5 part by weight of phosphate ion based on 100 parts by weight of total solid matter of said water-based resin composition and adjusted to a pH value of not less than 7, either followed by heating the coated substrate at 50°–250° C. to dry the coat or preceded by heating said steel substrate at 50°–250° C. to let the then-applied coat dry spontaneously.

6 Claims, No Drawings

RUST INHIBITING COATING COMPOSITION FOR ZINC, ZINC ALLOY PLATED OR UNPLATED STEEL

FIELD OF THE INVENTION

The present invention relates to a technology for rust inhibition of zinc or zinc alloy-coated steel or uncoated steel such as non-galvanized cold-rolled steel. More particularly, the present invention relates to a primary coating or undercoating method for rust inhibition of a zinc or zinc alloy-coated or uncoated steel sheet and a chromium-free rust inhibiting composition for use in said method.

BACKGROUND OF THE INVENTION

For the primary rust inhibition or undercoating of a zinc or zinc alloy-coated steel sheet carrying a galvanized coating layer formed by plating or thermal spraying with a zinc or zinc alloy-containing metal or an uncoated steel sheet, a chromium compound-containing resin coating agent is conventionally employed. As an example of such resin coating agent, Japanese Kokai Publication Hei-3-131370 discloses a resinous coating agent comprising an olefin-α, β-ethylenically unsaturated carboxylic acid copolymer resin dispersion supplemented with a water-dispersible chromium compound and a water-dispersible silica. However, coatings of this type containing toxic chromium ions have the risk of exerting ill effects on human health in the working environment and the chromium released from products carrying such chromium-containing coating layers tend to cause pollution problems.

To overcome the above disadvantages, there may be contemplated to develop a chromium-free resinous rust inhibiting agent or a rust inhibition method using such a chromium-free agent. However, it is impossible to provide a sufficiently effective rust inhibiting agent through mere elimination of chromium compounds. For a coating to be an effective rust inhibiting agent, it is required to meet the requirements of (1) resistance to penetration of corrosive fluids, (2) intimate adhesion of the coat to the substrate metal, (3) passivation of the metal by rust inhibitor ion, (4) water resistance, acid resistance and alkali resistance of the coat. When any of these requirements is not fully met, no sufficient rust inhibition can be expected. Resin compositions containing a chromium compound are satisfactory in passivating effect.

As a typical rust inhibitor ion that can be substituted for chromium ion, phosphate ion can be mentioned. However, phosphate ion is inferior to chromium ion in passivating effect, and mere use of phosphate ion in lieu of chromium ion provides for a certain level of rust prevention but does not insure a sufficient rust inhibition. Moreover, if phosphate ion is used in excess, the coat may develop blisters owing to excessive dissolution.

When silica is added to a chromium-containing resinous coating for enhanced rust inhibition, it is known that the use of water-dispersible silica particles is conducive to increased adhesion of the film and, hence, enhanced rust inhibiting effect but when a water-dispersible silica is added to a chromium-free resin composition, corrosion resistance is rather decreased as the proportion of silica is increased so that the anticorrosive property of silica cannot be fully exploited.

When a chromium compound is used in combination with a water-soluble or dispersible resin such as an olefin-α, β-ethylenically unsaturated carboxylic acid copolymer, high corrosion resistance can be obtained. However, in the absence of a chromium compound, such properties as film durability and adhesion cannot be insured in a sufficient degree by short-time low-temperature drying. In a rust inhibiting resinous coating agent, the resin is expected to form a film which functions as a barrier to corrosive fluids and inhibits release of corrosion inhibitor ion and, therefore, if the film ages due to hydrolysis or the like or its adhesion to the substrate surface is poor, the water resistance and corrosion resistance of the product will be insufficient. Thus, a rapid penetration by corrosive fluids tends to take place in areas of insufficient adhesion and ultimately cause an extensive exfoliation of the film. Moreover, such a water-soluble or dispersible resin is poor in drying properties and cannot satisfy the need for rationalized production.

In view of the above state of the art, the present invention has for its object to provide a method for rust inhibition treatment of zinc or zinc alloy-coated or uncoated steel by which a rust inhibiting film at least as satisfactory as the film obtainable with a chromium-containing resinous coating agent can be formed on the substrate surface without employing chromium which is a toxic substance and a rust inhibiting chromium-free resin composition capable of yielding a film at least as satisfactory as the film obtainable with a chromium-containing resinous coating agent on zinc or zinc alloy-coated or uncoated steel, particularly a rust inhibiting composition which can be either coated on zinc or zinc alloy-coated or uncoated steel and then dried by heating or coated on preheated steel and then let dry spontaneously.

SUMMARY OF THE INVENTION

The gist of the present invention resides in the rust prevention technology which essentially comprises coating a zinc or zinc alloy-coated or uncoated steel substrate with a water-based resin composition comprising 30 to 100 parts by weight of solid matter of a carboxylated polyolefin resin, 70 to 0 part by weight of solid matter of at least one member selected from the group consisting of polyurethane resin, polyester resin, acrylic resin, epoxy resin, and alkyd resin as supplemented with 0.01 to 0.5 part by weight of phosphate ion per 100 parts by weight of total solid matter of said water-based resin composition and adjusted to a pH value of not less than 7, either followed by drying the coat at 50° to 250° C. or preceded by heating said zinc or zinc alloy-coated or uncoated steel substrate at 50° to 250° C. to let the subsequently applied coat dry spontaneously.

In another aspect, the present invention provides a rust inhibiting coating composition which is obtainable by adding 0.01 to 0.5 part by weight of phosphate ion to 100 parts by weight of total solid matter of a water-based resin composition comprising 30 to 100 parts by weight of solid matter of a carboxylated polyolefin resin and 70 to 0 part by weight of solid matter of at least one member selected from the group consisting of polyurethane resin, polyester resin, acrylic resin, epoxy resin, and alkyd resin and adjusting the pH of the whole composition to not less than 7.

DETAILED DESCRIPTION OF THE INVENTION

The method for rust inhibition treatment of a zinc or zinc alloy-coated or uncoated steel substrate according to the present invention employs a composition (hereinafter referred to as the composition of the invention) which is obtainable by adding 0.01 to 0.5 part by weight of phosphate ion to 100 parts by weight of a water-based resin composition comprising 30 to 100 parts by weight of solid matter of a carboxylated polyolefin resin and 70 to 0 part by weight of solid matter of at least one member selected from the group consisting of polyurethane resin, polyester resin, acrylic resin, epoxy resin, and alkyd resin and adjusting the pH of the whole composition to not less than 7. The water-based resin composition mentioned above has the function to form a protective film on the substrate surface to isolate the surface from the ambient corrosive environment and, at the same time, inhibit emigration of phosphate ion for enhanced corrosion resistance.

The above-mentioned water-based resin composition comprises a carboxylated polyolefin resin and at least one member selected from the group consisting of polyurethane resin, polyester resin, acrylic resin, epoxy resin, and alkyd resin. There is no limitation on the kinds of carboxylated polyolefin resin, polyurethane resin, polyester resin, acrylic resin, epoxy resin, and alkyd resin that can be used only if they are either water-soluble or water-dispersible in the pH range of not less than 7. The carboxylated polyolefin resin that can be used is any resin that can be produced by copolymerizing an $\alpha$-olefin, such as ethylene, propylene, butene, etc., with an $\alpha$, $\beta$-ethylenically unsaturated carboxylic acid, such as acrylic acid, methacrylic acid, maleic acid, etc., so as to introduce carboxyl groups into the backbone chain of the polyolefin. The rate of carboxylation of said carboxylated polyolefin resin is preferably in the range of 10 to 30%. When the carboxylation rate is below 10%, the polyolefin resin is not well dispersible in water so that water-dispersible silica, when added, will not be well dispersible in the resin. When the carboxylation rate exceeds 30%, the water repellency of the resin is decreased so that the corrosion resistance of the coat is sacrificed.

In the above-mentioned water-based resin composition, the ratio of said member selected from among polyurethane resin, polyester resin, acrylic resin, epoxy resin, and alkyd resin to said carboxylated polyolefin resin is not greater than 70 parts by weight of the former to 30 to 100 parts by weight of the latter. If the proportion of at least one member selected from among polyurethane resin, polyester resin, acrylic resin, epoxy resin, and alkyd resin exceeds 70 parts by weight, corrosive fluids may invade the interface between the zinc or zinc alloy-coated steel and the coating film to encourage exfoliation of the film. The preferred proportions are 30 to 90 parts by weight of said carboxylated polyolefin resin and 70 to 10 parts by weight of said member selected from among polyurethane resin, polyester resin, acrylic resin, epoxy resin, and alkyd resin. When the proportion of the latter is less than 10 parts by weight, microfine blisters develop to detract from rust inhibiting effect and, because the proportion of carboxylated polyolefin exceeds 90 weight %, the drying properties of the coating composition are sacrificed in an objectionable degree.

The above-mentioned object of the invention can be successfully accomplished when the proportions of carboxylated polyolefin resin and said member selected from among polyurethane resin, polyester resin, acrylic resin, epoxy resin, and alkyd resin are confined within the above-mentioned range.

The source of said phosphate ion that can be used is not critical in kind but includes phosphoric acid ($H_3PO_4$), sodium phosphate ($Na_3PO_4$), sodium monohydrogen phosphate ($Na_2HPO_4$), sodium dihydrogen phosphate ($NaH_2PO_4$), potassium phosphate ($K_3PO_4$), potassium monohydrogen phosphate ($K_2HPO_4$), potassium dihydrogen phosphate ($KH_2PO_4$), ammonium phosphate (($NH_4)_3PO_4$), ammonium monohydrogen phosphate (($NH_4)_2HPO_4$), and ammonium dihydrogen phosphate (($NH_4)H_2PO_4$), among other phosphate ion donors. Aside from the above-mentioned sources, low molecular amine salts of phosphoric acid, such as hydrazinium phosphate, and phosphoric esters of comparatively low molecular weight, such as ethyl phosphate, can also be mentioned. Preferred, among them, are salts with volatile bases, e.g. ammonium phosphate, ammonium monohydrogen phosphate, ammonium dihydrogen phosphate, etc., and low molecular amine salts of phosphoric acid, e.g. hydrazinium phosphate.

The proportion of said phosphate ion is 0.01 to 0.5 parts by weight based on each 100 parts by weight of solid matter of said water-based resin composition. When the proportion of phosphate ion is less than 0.01 part by weight, the formation of a metal phosphate layer, e.g. a zinc phosphate layer, across the interface between the substrate metal and the coat will not be sufficient and thorough for inhibition of corrosion. When the proportion of phosphate ion exceeds 0.5 part by weight, the electrolyte concentration of the film is increased to render the film permeable to water, with the result that the salt spray test (SST) performance is adversely affected and the water resistance of the film is reduced. Furthermore, since the presence of excessive phosphate ion causes gelation of aqueous resin in the rust inhibiting composition with the passage of time, the storage stability of the rust inhibiting composition is sacrificed. The preferred phosphate ion content is 0.05 to 0.2 part by weight.

The pH of the composition of the invention is not less than 7. If the pH of the composition is less than 7, the water-based resin dispersed in water may undergo gelation. The preferred range is pH 8 to 12. Adjustment of pH can be carried out using aqueous ammonia, an amine compound, or a metal hydroxide such as lithium hydroxide, potassium hydroxide, sodium hydroxide, etc., to mention but a few examples.

The composition of the present invention may contain a water-dispersible silica as an additive for improved drying properties, scratch resistance, and film adhesion. The water-dispersible silica mentioned above is not particularly restricted in kind only if it is lean in impurity such as sodium and weakly basic. Thus, commercial silica gels such as Snowtex N (Nissan Chemical Industries, Ltd.), Adelite AT-20N (Asahi Denka Kogyo K. K.), etc. and commercial aerosil grade silica powders can be typically mentioned. The preferred particle size of silica is 10 to 20 μm.

The proportion of water-dispersible silica is 0.1 to 30 parts by weight per 100 parts by weight of solid matter of said water-based resin composition. When the proportion is less than 0.1 part by weight, the expected effect will not be sufficiently realized, while the use of silica in a proportion exceeding 30 parts by weight will detract from the rust-preventive performance of the film.

The composition of the present invention may further contain other ingredients. Among such other ingredients are pigments and surfactants. A silane coupling agent may also be incorporated for improved affinity of resin for silica and pigment particles and improved adhesion between resin and zinc or iron phosphate layers.

The pigments that can be used include a variety of colored inorganic pigments such as titanium dioxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, iron oxide ($Fe_2O_3$, $Fe_3O_4$), etc. and a variety of colored organic pigments.

The silane coupling agent that can be used includes but is not limited to γ-aminopropyltrimethoxysilane, γ-aminopropyltriethoxysilane, γ-glycidoxypropyltrimethoxysilane, γ-methacryloxypropyltrimethoxysilane, and N-[2-(vinylbenzylamino)ethyl]-3-aminopropyltrimethoxysilane.

The composition of the present invention may contain a solvent for improved film-forming properties of the water-based resin and, hence, a uniform and smooth coated surface. The solvent may be virtually any solvent that is generally used in coatings, thus including alcohols, ketones, esters, and ethers.

In accordance with the present invention, a zinc or zinc alloy-coated or uncoated steel substrate can be protected against corrosion by treating the substrate with the above-described composition of the invention. The method for rust inhibition treatment of such a steel substrate either comprises coating the substrate with the composition of the invention and drying the coat in a current of hot air or heating the substrate beforehand, coating it with the composition, and letting the coat dry spontaneously under residual heat.

The drying temperature is 50° to 250° C. in either procedure. When drying is carried out at a temperature below 50° C., no satisfactory film formation can be expected because the evaporation of water is retarded, with the result that no sufficient inhibition of corrosion can be materialized. On the other hand, when 250° C. is exceeded, pyrolysis of the water-based resin takes place to sacrifice the SST performance and water resistance and cause yellowing. The preferred temperature range is 70° to 100° C.

When the coated substrate is dried in a current of hot air, the preferred drying time is 1 second to 5 minutes.

The coating film thickness for the composition of the invention is preferably not less than 0.1 µm. When the dry thickness of the film is less than 0.1 µm, no sufficient rust inhibition can be expected. When the film is too thick, it is not only uneconomical for undercoating purposes but also unsatisfactory for the performance of surface coating. Thus, the film thickness is preferably within the range of 0.1 to 20 µm and, for better results, 0.1 to 10 µm.

There is no particular limitation on coating techniques that can be used. Thus, the conventional techniques such as roll coating, air spray coating, airless spray coating, dip coating, etc. can be utilized.

The rust inhibiting composition of the present invention contains phosphate ion. Phosphate ion reacts with the substrate metal to form a water-insoluble phosphate such as zinc phosphate or iron phosphate, thus insuring corrosion inhibition. Such a water-insoluble phosphate is sufficiently stable even in an acidic environment. Thus, under the acidic environment, e.g. in the anode region in a corrosive fluid, the phosphate ion released and concentrated onto the interface between the substrate and the coat reacts with the zinc or iron metal of the substrate to form a stable metal phosphate layer so that the acid resistance of the product can be increased.

EXAMPLES

The following examples illustrate the present invention in further detail but are by no means limitative of the scope of the invention.

Example 1

As the carboxylated polyolefin resin, Hytec S-7024 (ethylene-$\alpha$, $\beta$-ethylenically unsaturated carboxylic acid (14 to 24 wt. %) copolymer, Toho Chemical Co., Ltd.) was used. To 100 parts by weight of solid matter of this carboxylated polyolefin resin were added 3 parts by weight of solid matter of Snowtex N (water-dispersible silica, Nissan Chemical Industries, Ltd.) and 0.15 part by weight of ammonium phosphate [$(NH_4)_3PO_4$] (Wako Pure Chemical Industries) (0.10 part by weight as phosphate ion) as phosphate ion donor, followed by addition of water and 30-minute stirring to prepare a dispersion of 20 weight % solid matter. The dispersion was adjusted to pH 9.0 to provide a composition of the invention.

A commercial hot-dip galvanized steel sheet (Z-27, Japan Test Panel Co., 70×150×2.3 mm) preheated to 80° C. was coated with the above composition using a bar coater (#5) in a dry thickness of 2 to 3 µm and the coat was dried. The galvanized steel sheet was subjected to surface polishing with Scotch Bright, degreasing with an alkali degreaser (Surf Cleaner 53, Nippon Paint Co., Ltd.), rinsing, and drying prior to use.

The hot-dip galvanized steel sheet coated with the composition and dried was evaluated for the following parameters. The results are shows in Table 1.

(1) Drying properties

Using a bar coater (#5), a commercial hot-dip galvanized steel sheet (Z-27, Japan Test Panel, 70×150×2.3 mm) preheated to 80° C. was coated with the composition and, after 5 seconds, the degree of adhesion of the coating film was tested by the finger-tack method and evaluated on the following 5-point scale.

5 points: no tack
4 points: slight tack
3-2 points: fair tack
1 points: marked tack (2) Hot-water resistance test The sample was immersed in a constant-temperature bath at 40° C. for 10 days and the degree of developed white rust was evaluated on the following 10-point scale.

10 points: no abnormality
9 points: intermediate between 10 and 8 points
8 points: slight blister
7-6 points: intermediate between 8 and 5 points
5 points: blister in ½ area
4-2 points: intermediate between 5 and 1 point
1 point: blister all over (3) SST A 5% aqueous solution of sodium chloride was sprayed over the coated surface at 35° C. and, after 16 hours, the degree of developed white rust was evaluated on the following 10-point scale.

10 points: no abnormality
9 points: intermediate between 10 and 8 points
8 points: slight white rust
7-6 points: intermediate between 8 and 5 points
5 points: white rust in ½ area
4-2 points: intermediate between 5 and 1 point
1 point: white rust all over Examples 2 to 5 and 7

Compositions were prepared in the same manner as in Example 1 except that carboxylated polyolefin resin, polyurethane resin (Olester XUD 2123, Mitsui Toatsu Chemicals, Inc.), Snowtex N, and ammonium phosphate were used according to the formulas shown in Table 1. Each composition was coated on the substrate surface, dried, and evaluated. The ammonium phosphate was used in a proportion of 0.10 part by weight as phosphate ion. The results are shown in Table 1.

Example 6

Using an acrylic resin (EM 1220, Nippon Paint Co., Ltd.) in lieu of the polyurethane resin (Olester XUD 2123, Mitsui Toatsu Chemicals, Inc.), a composition was prepared in otherwise the same manner as Example 2. The composition was applied, dried, and evaluated. The results are shown in Table 1.

Example 8

A composition was prepared according to Example 3 and using a bar coater (#5), a commercial hot-melt galvanized steel sheet (Z-27, Nippon Test Panel, 70×150×2.3 mm), not heated beforehand, was coated with the above composition in a dry thickness of 2 to 3 μm. The coated plate was heated (heating after coating) at 80° C. for 5 minutes to dry the coat. Before use, the hot-dip galvanized steel sheet was polished with Scotch Bright, degreased with an alkali degreaser (Surf Cleaner 53, Nippon Paint Co., Ltd.), rinsed, and dried.

The hot-dip galvanized steel sheet coated and dried as above was evaluated as in Example 1 except the performance of drying properties. The results are shown in Table 1.

Example 9

The procedure of Example 8 was repeated except that the drying temperature was set to 250° C. and the drying time to 5 seconds to provide a composition, which was then applied, dried, and evaluated. The results are shown in Table 1.

Comparative Example 1

Using 100 parts by weight of solid matter of carboxylated polyolefin resin, 70 parts by weight of solid matter of Snowtex N, and 5 parts by weight of strontinum chromate, the procedure of Example 1 was otherwise repeated to provide a composition. The composition was coated on the substrate surface, dried, and evaluated. The results are shown in Table 2.

Comparative Examples 2 to 6

According to the formulas shown in Table 2, the procedure of Example 1 was otherwise repeated to provide compositions. Each of the compositions was coated on the substrate surface, dried, and evaluated in the same manner as described above. The results are shown in Table 2.

TABLE 2

| | Comparative Example | | | | | |
|---|---|---|---|---|---|---|
| | 1 | 2 | 3 | 4 | 5 | 6 |
| Formula (wt. parts of solid matter) | | | | | | |
| Hytec S-7024 | 100 | 20 | 0 | 60 | 60 | 60 |
| Olester-XUD2123 | — | 80 | 100 | 40 | 40 | 40 |
| Em1220 | — | — | — | — | — | — |
| Snowtex N | 70 | 3 | 3 | 70 | 3 | 70 |
| Strontium chromate | 5 | — | — | — | — | — |
| Ammonium phsophate | — | 0.15 | 0.15 | 0 | 0 | |
| Drying method and temperature | Before coating 80° C. | Before coating 80° C. | Before coating 80° C. | Before coating 80° C. | Before coating 80° C. | Before coating 80° C. |
| Drying property Evaluation | 3 | 4 | 4 | 4 | 3 | 4 |
| Resistance to hot water (10 days) | 8 | 5 | 1 | 3 | 4 | 1 |
| SST (16 hrs) | 7 | 3 | 2 | 2 | 3 | 2 |

It is clear from the above Examples that although the use of carboxylated polyolefin resin alone is sufficient to insure a practically useful rust inhibiting effect, the use of carboxylated polyolefin resin in combination with one or more other water-soluble or dispersible resins such as polyurethane resin, acrylic resin, etc. lead to marked improvements in drying properties, hot water resistance, SST performance, etc. as compared with the use of carboxylated polyolefin resin alone. Particularly beneficial effects could be obtained when polyurethane resin was used as said other resin. It was also found that the use of phosphate ion results in marked improvement in corrosion resistance and that the addition of water-dispersible silica is conducive to improved drying properties. Moreover, while the rust inhibiting composition for zinc or zinc alloy-coated and uncoated steel according to the present invention shows excellent anticorrosive and hot water-resisting properties on drying after coating, markedly

TABLE 1

| | Example | | | | | | | | |
|---|---|---|---|---|---|---|---|---|---|
| | 1 | 2 | 3 | 4 | 5 | 6 | 7 | 8 | 9 |
| Formula (wt. parts of solid matter) | | | | | | | | | |
| Hytec S-7024 | 100 | 80 | 60 | 40 | 60 | 60 | 60 | 60 | 60 |
| Olester-XUD2123 | — | 20 | 40 | 60 | 40 | — | 40 | 40 | 40 |
| EM1220 | — | — | — | — | — | 40 | — | — | — |
| Snowtex N | 3 | 3 | 3 | 3 | 25 | 3 | 0 | 3 | 3 |
| Strontium chromate | — | — | — | — | — | — | — | — | — |
| Ammonium phosphate | 0.15 | 0.15 | 0.15 | 0.15 | 0.15 | 0.15 | 0.15 | 0.15 | 0.15 |
| Drying method and temperature | Before coating 80° C. | Before coating 80° C. | Before coating 80° C. | Before coating 80° C. | Before coating 80° C. | Before coating 80° C. | Before coating 80° C. | After coating 80° C. | After coating 250° C. |
| Evaluation | | | | | | | | | |
| Drying property | 2 | 3 | 4 | 4 | 4 | 3 | 3 | — | — |
| Resistance to hot water (10 days) | 7 | 8 | 8 | 9 | 7 | 7 | 8 | 9 | 9 |
| SST (16 hrs) | 5 | 6 | 8 | 7 | 6 | 6 | 8 | 8 | 9 | improved anticorrosive and hot water-resisting properties are also obtained when the steel substrate has been heated beforehand, in comparison with the chromium-containing coating composition. Furthermore, drying could be successfully accomplished in a short time at a comparatively mild temperature of about 80° C.

Being constituted as described above, the present invention implements a rust prevention technology for zinc or zinc alloy-coated or uncoated steel which, without employing toxic chromium, insures the same degree of rust inhibition as the chromium compound-containing resin composition.

Furthermore, the invention provides a non-chromium type rust inhibiting composition capable of providing the same degree of rust inhibition as the chromium-containing composition and offering a choice of coating a substrate and heating the coated substrate or heating the substrate, then coating it, and letting the coated substrate dry spontaneously.

We claim:

1. A method for rust inhibition treatment of steel which comprises coating a zinc or zinc alloy-coated or uncoated steel substrate with a water-based resin composition comprising 30 to 100 parts by weight of solid matter of a carboxylated polyolefin resin and 70 to 0 part by weight of solid matter of at least one member selected from the group consisting of polyurethane resin, polyester resin, acrylic resin, epoxy resin, and alkyd resin as supplemented with 0.01 to 0.5 part by weight of phosphate ion based on 100 parts by weight of total solid matter of said water-based resin composition and adjusted to a pH value of not less than 7, either followed by heating the coated substrate at 50° to 250° C. to dry the coat or preceded by heating said steel substrate at 50° to 250° C. to let the then-applied coat dry spontaneously.

2. A method for rust inhibition treatment of steel which comprises coating a zinc or zinc alloy-coated or uncoated steel substrate with a water-based resin composition comprising 30 to 90 parts by weight of solid matter of a carboxylated polyolefin resin and 70 to 10 parts by weight of solid matter of at least one member selected from the group consisting of polyurethane resin, polyester resin, acrylic resin, epoxy resin, and alkyd resin as supplemented with 0.01 to 0.5 part by weight of phosphate ion and 0.1 to 30 parts by weight of water-dispersible silica, each based on 100 parts by weight of solid matter of said water-based resin composition, either followed by heating the coated substrate at 50° to 250° C. to dry the coat or preceded by heating said steel substrate at 50° to 250° C. to let the then-applied coat dry spontaneously.

3. A rust inhibiting composition for zinc or zinc alloy-coated or uncoated steel which comprises a water-based resin composition comprising 30 to 100 parts by weight of solid matter of a carboxylated polyolefin resin of which the rate of carboxylation is in the range of 10 to 30% and 70 to 0 part by weight of solid matter of at least one member selected from the group consisting of polyurethane resin, polyester resin, acrylic resin, epoxy resin, and alkyd resin as supplemented with 0.05 to 0.2 part by weight, relative to 100 parts by weight of total solid matter of said water-based resin composition, of phosphate ion and having a pH value of not less than 7.

4. A rust inhibiting composition for zinc or zinc alloy-coated or uncoated steel which comprises a water-based resin composition comprising 30 to 90 parts by weight of solid matter of a carboxylated polyolefin resin of which the rate of carboxylation is in the range of 10 to 30% and 70 to 10 part by weight of solid matter of at least one member selected from the group consisting of polyurethane resin, polyester resin, acrylic resin, epoxy resin, and alkyd resin as supplemented with 0.05 to 0.2 part by weight of phosphate ion based on 100 parts by weight of total solid matter of said water-based resin composition and adjusted to a pH value of not less than 7.

5. A rust inhibiting composition for zinc or zinc alloy-coated or uncoated steel as claimed in claim 3 further comprising 0.1 to 30 parts by weight of a water-dispersible silica per 100 parts of total solid matter of said water-based resin composition and having a pH value of not less than 7.

6. A rust inhibiting composition for zinc or zinc alloy-coated or uncoated steel as claimed in claim 4 further comprising 0.1 to 30 parts by weight of a water-dispersible silica per 100 parts of total solid matter of said water-based resin composition and having a pH value of not less than 7.

* * * * *